United States Patent
Barrese et al.

(10) Patent No.: US 7,890,376 B2
(45) Date of Patent: Feb. 15, 2011

(54) SYSTEM AND METHOD FOR LOCATION BASED CONTENT CORRELATION

(75) Inventors: James J. Barrese, San Jose, CA (US); Pritchett L. Dan, San Jose, CA (US)

(73) Assignee: eBay Inc., San Jose, CA (US)

( * ) Notice: Subject to any disclaimer, the term of this patent is extended or adjusted under 35 U.S.C. 154(b) by 698 days.

(21) Appl. No.: 10/982,239

(22) Filed: Nov. 5, 2004

(65) Prior Publication Data

US 2006/0099964 A1    May 11, 2006

(51) Int. Cl.
    *G06Q 30/00*    (2006.01)
(52) U.S. Cl. .................... 705/26; 705/1; 705/7; 705/8; 705/14; 705/27; 705/37; 455/41.1; 455/456.1; 455/456.3; 455/412.1; 455/414.1
(58) Field of Classification Search .................. 705/8, 705/26, 27, 14, 37, 7, 16, 1; 455/456.1, 412.1, 455/414.1, 41.1, 456.3; 340/539.18
See application file for complete search history.

(56) References Cited

U.S. PATENT DOCUMENTS

| | | | |
|---|---|---|---|
| 6,041,307 A * | 3/2000 | Ahuja et al. ................... 705/8 |
| 6,675,165 B1 | 1/2004 | Rothschild |
| 6,988,103 B2 | 1/2006 | Chithambaram et al. |
| 7,027,801 B1 * | 4/2006 | Hall et al. ................. 455/412.1 |
| 7,076,460 B2 | 7/2006 | Dinwoodie |
| 7,092,957 B2 | 8/2006 | Klein |
| 7,107,285 B2 | 9/2006 | von Kaenel et al. |
| 7,200,566 B1 | 4/2007 | Moore et al. |
| 7,729,953 B2 | 6/2010 | Pandurangan |
| 2001/0049636 A1 * | 12/2001 | Hudda et al. ................... 705/26 |
| 2001/0056396 A1 | 12/2001 | Goino |
| 2002/0069096 A1 * | 6/2002 | Lindoerfer et al. ............. 705/7 |
| 2002/0087522 A1 | 7/2002 | MacGregor et al. |
| 2002/0103713 A1 | 8/2002 | Kim |
| 2002/0120554 A1 * | 8/2002 | Vega ........................... 705/37 |
| 2002/0187750 A1 * | 12/2002 | Majumdar ................... 455/41 |
| 2003/0061211 A1 | 3/2003 | Shultz et al. |
| 2003/0134648 A1 * | 7/2003 | Reed et al. ................... 455/456 |
| 2005/0151642 A1 * | 7/2005 | Tupler et al. ........... 340/539.18 |
| 2006/0121912 A1 * | 6/2006 | Borjesson ................ 455/456.1 |
| 2007/0032247 A1 | 2/2007 | Shaffer et al. |

(Continued)

FOREIGN PATENT DOCUMENTS

KR    0063874    11/2000

OTHER PUBLICATIONS

U.S. Appl. No. 11/870,542, Non-Final Office Action mailed Jun. 19, 2009, 19 Pgs.
U.S. Appl. No. 11/870,542, Response filed Sep. 21, 2009 to Non Final Office Action mailed Jun. 19, 2009, 13 pgs.
U.S. Appl. No. 11/870,542, Notice of Allowance mailed Jan. 13, 2010, 14 Pgs.

(Continued)

*Primary Examiner*—Yogesh C Garg
(74) *Attorney, Agent, or Firm*—Schwegman, Lundberg & Woessner, P.A.

(57) ABSTRACT

A method and a system to correlate location and content. For example hyperlinked content can be received from a user including current geographical position data. The current geographical position data can be extracted from the hyperlinked content. Location or geographically-based content can be selected based on the current geographical position data. The geographical based content can be returned to the user.

10 Claims, 9 Drawing Sheets

U.S. PATENT DOCUMENTS

| | | |
|---|---|---|
| 2007/0118426 A1* | 5/2007 | Barnes, Jr. .................. 705/14 |
| 2007/0299784 A1 | 12/2007 | Kar |
| 2008/0133426 A1 | 6/2008 | Porat et al. |
| 2008/0172307 A1 | 7/2008 | Hurowitz et al. |
| 2009/0099951 A1 | 4/2009 | Pandurangan |
| 2010/0211481 A1 | 8/2010 | Pandurangan |
| 2010/0217688 A1 | 8/2010 | Pandurangan |

OTHER PUBLICATIONS

International Application Serial No. PCT/US2008/011552, International Search Report mailed Mar. 27, 2009, 4 pgs.

International Application Serial No. PCT/US2008/011552, Written Opinion mailed Mar. 27, 2009, 7 pgs.

* cited by examiner

SYSTEM AND METHOD FOR LOCATION BASED CONTENT CORRELATION

FIELD OF THE INVENTION

Exemplary embodiments relate generally to the technical field of commerce automation and, in one exemplary embodiment, to methods and systems to correlate client location with geographical based content.

BACKGROUND OF THE INVENTION

Currently, networked based commerce is completed by manually selecting the area or region a client or merchant/vendor establishes as their respective market. In the United States, a zip code can be used to tailor returned content. These types of "zoning" of goods and/or services (products or listings) wanted or offered are very broad and also must be manually entered by a user to establish or identify a market zone. If a user is mobile, the problem may worsen as the user would have to change or modify the market zone or area.

BRIEF DESCRIPTION OF THE DRAWINGS

Embodiments are illustrated by way of example and not by way of limitation in the figures of the accompanying drawings in which like references indicate similar elements. It should be noted that references to "an" embodiment in this disclosure are not necessarily to the same embodiment, and such a reference may mean at least one.

DETAILED DESCRIPTION

A method and system to correlate location with content are described. In the following description, for purposes of explanation, numerous specific details are set forth in order to provide a thorough understanding of an exemplary embodiment of the present invention. It will be evident, however, to one skilled in the art that the present invention may be practiced without these specific details.

Exemplary Platform Architecture

Figure 1:
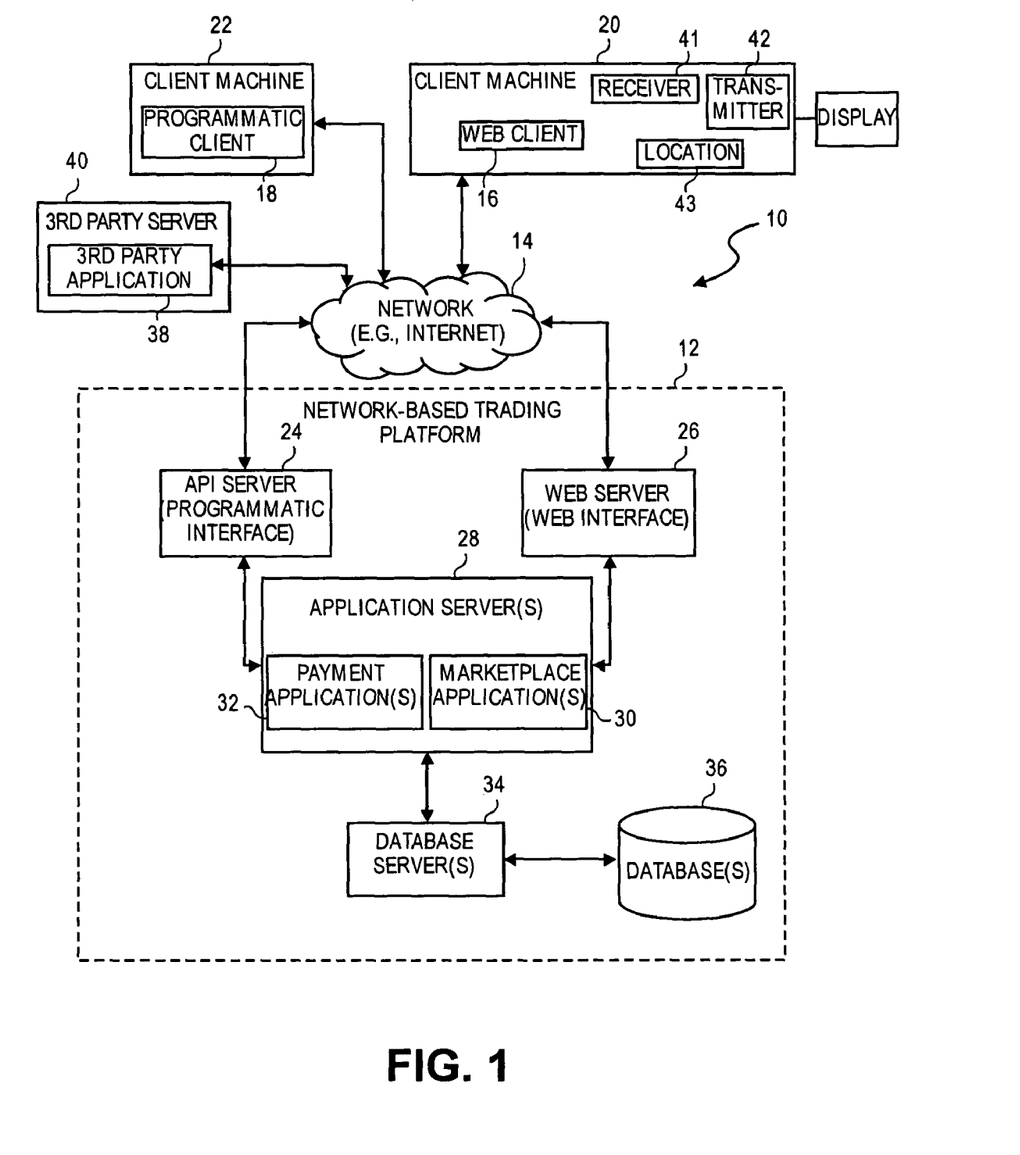
FIG. 1 is a block diagram of an exemplary web-based facility in the form of a network-based marketplace (e.g., a network-based auction facility) according to one embodiment of the present invention.

FIG. 1 is a network diagram depicting a system 10, according to one exemplary embodiment, having a client-server architecture. A commerce platform, in the exemplary form of a network-based marketplace 12, provides server-side functionality, via a network 14 (e.g., the Internet) to one or more client machines 20 and 22. FIG. 1 illustrates, for example, a web client 16 (e.g., a browser, such as the INTERNET EXPLORER browser developed by Microsoft Corporation of Redmond, Wash. State), and a programmatic client 18 executing on respective client machines 20 and 22.

Turning specifically to the network-based marketplace 12, an Application Program Interface (API) server 24 and a web server 26 are coupled to, and provide programmatic and web interfaces respectively to, one or more application servers 28. The application servers 28 host one or more marketplace applications 30 and payment applications 32. The application servers 28 are, in turn, shown to be coupled to one or more database servers 34 that facilitate access to one or more databases 36.

The marketplace applications 30 provide a number of marketplace functions and services to users that access the marketplace 12. The payment applications 32 likewise provide a number of payment services and functions to users. The payment applications 30 may allow users to quantify for, and accumulate, value (e.g., in a commercial currency, such as the U.S. dollar, or a proprietary currency, such as "points") in accounts, and then later to redeem the accumulated value for products/listings (e.g., goods and/or services) that are made available via the marketplace applications 30. While the marketplace and payment applications 30 and 32 are shown in FIG. 1 to both form part of the network-based marketplace 12, it will be appreciated that, in alternative embodiments, the payment applications 32 may form part of a payment service that is separate and distinct from the marketplace 12.

Further, while the exemplary system 10 shown in FIG. 1 employs a client-server architecture, the present invention is of course not limited to such an architecture, and could equally well find application in a distributed, or peer-to-peer, architecture system. The various marketplace and payment applications 30 and 32 could also be implemented as standalone software programs, which do not necessarily have networking capabilities.

The web client 16, it will be appreciated, may access the various marketplace and payment applications 30 and 32 via the web interface supported by the web server 26. Similarly, the programmatic client 18 may access the various services and functions provided by the marketplace and payment applications 30 and 32 via the programmatic interface provided by the API server 24. The programmatic client 18 may, for example, be a seller application (e.g., the TURBOLISTER application developed by eBay Inc., of San Jose, Calif.) to enable sellers to author and manage listings on the marketplace 12 in an off-line manner, and to perform batch-mode communications between the programmatic client 18 and the network-based marketplace 12.

FIG. 1 also illustrates a third party application 38, executing on a third party server machine 40, as having programmatic access to the network-based marketplace 12 via the programmatic interface provided by the API server 24. For example, the third party application 38 may, utilizing information retrieved from the network-based marketplace 12, support one or more features or functions on a website hosted by the third party. The third party website may, for example, provide one or more promotional, marketplace or payment functions that are supported by the relevant applications of the network-based marketplace 12.

In one embodiment, client machine 20 also includes a receiver 41, transmitter 42, a location device 43 and a display 45. In one embodiment receiver 41 wirelessly receives data/information and transmitter 42 transmits data/information wirelessly. In one embodiment, client machine 20 is mobile, such as disposed in a vehicle, a notebook computer, a personal digital assistant (PDA), a cellular telephone, etc. Receiver 41 may be capable of receiving information/data/voice/video content, for example from network 14. Transmitter 42 may be capable of transmitting information/data/voice/video content to, for example network 14. Location device 43 may be capable of rendering geographical location information. In one exemplary embodiment, location device 43 is a global positioning system (GPS) and renders latitude, longitude and altitude coordinates. In another exemplary embodiment, location device 43 receives location coordinates from cellular triangulation of cellular towers, for example three cellular towers. The display 45 can be any type of display capable, for example, of displaying graphical/video/images/text. A user interface may also be coupled to client machine 20. The user interface may be a keyboard, resistive digitizer (e.g., touchscreen), mouse, microphone/speaker(s), etc. Transmitter 42 may transmit location information/data in a hypertext (HTTP) transmission.

Marketplace Applications

Figure 2:
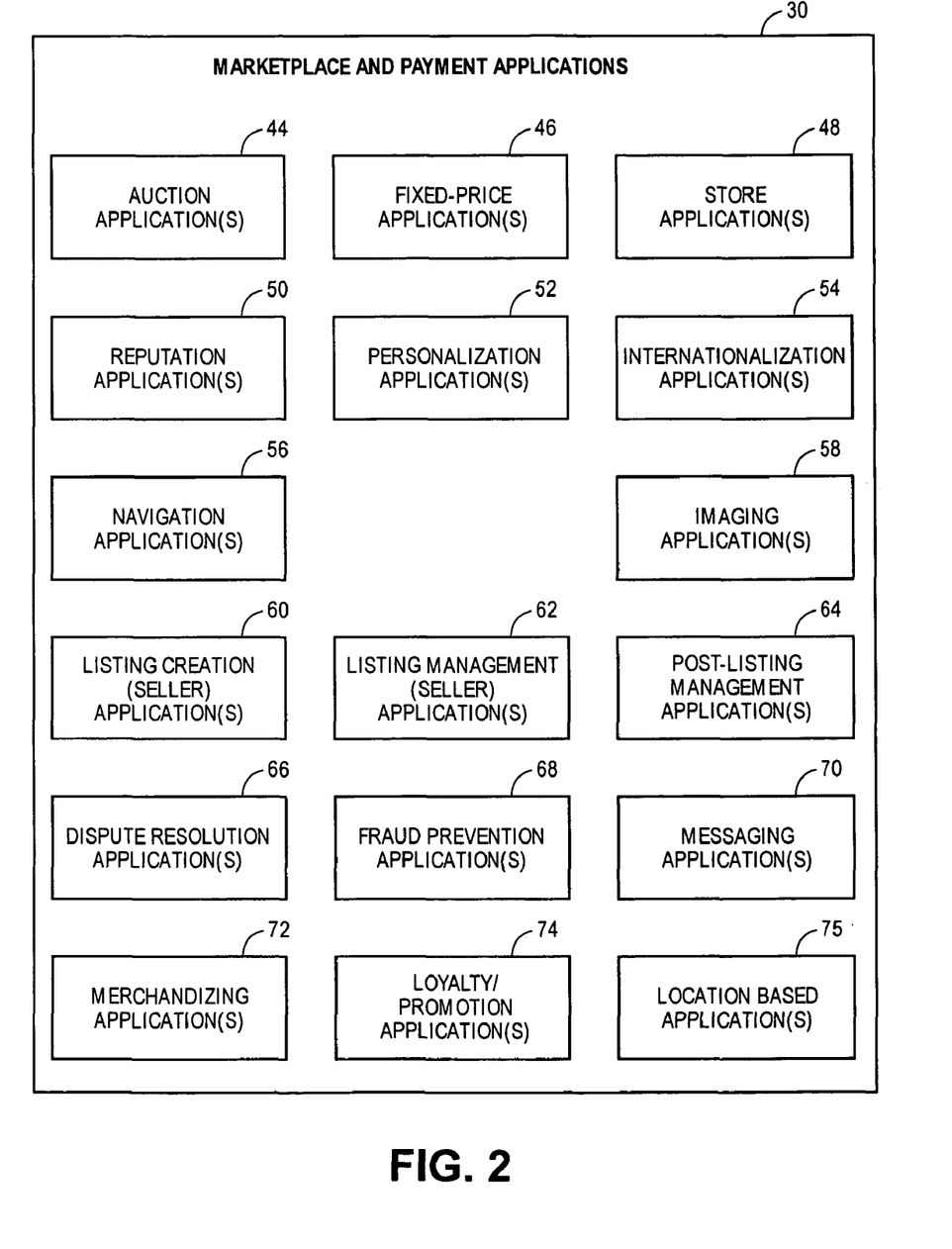
FIG. 2 is a block diagram illustrating multiple marketplace and payment applications that are provided as part of the network-based marketplace according to one embodiment of the present invention.

FIG. 2 is a block diagram illustrating multiple marketplace and payment applications 30 that, in one exemplary embodiment of the present invention, are provided as part of the network-based marketplace 12. The marketplace 12 may provide a number of listing and price-setting mechanisms whereby a seller may provide listings (e.g., list goods and/or services for sale, auction, hire etc.) a buyer can express interest in or indicate a desire to purchase such listings or goods or services, and a price can be set for a transaction pertaining to the goods or services. To this end, the marketplace applications 30 are shown to include one or more auction applications 44 which support auction-format listing and price setting mechanisms (e.g., English, Dutch, Vickrey, Chinese, Double, Reverse auctions etc.). The various auction applications 44 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 46 may support fixed-price listing formats (e.g., the traditional classified advertisement-type listing or a catalogue listing) and buyout-type listings. For example, buyout-type listings (e.g., including the BUY-IT-NOW (BiN) technology developed by eBay Inc., of San Jose, Calif.) may be offered in conjunction with an auction-format listing, and allow a buyer to purchase goods or services, which are also being offered for sale via an auction, for a fixed-price that is typically higher than the starting price of the auction.

Store applications 48 may allow sellers to group their listings within a "virtual" store, which may be branded and otherwise personalized by and for the sellers. Such a virtual store may also offer promotions, incentives and features that are specific and personalized to a relevant seller.

Reputation applications 50 may allow parties that transact utilizing the network-based marketplace 12 to establish, build and maintain reputations, which may be made available and published to potential trading partners. Consider that where, for example, the network-based marketplace 12 supports person-to-person trading, users may have no history or other reference information whereby the trustworthiness and credibility of potential trading partners may be assessed. The reputation applications 50 may allow a user, for example through feedback provided by other transaction partners, to establish a reputation within the network-based marketplace 12 over time. Other potential trading partners may then reference such a reputation for the purposes of assessing credibility and trustworthiness. Personalization applications 52 may allow users of the marketplace 12 to personalize various aspects of their interactions with the marketplace 12. For example a user may, utilizing an appropriate personalization application 52, create a personalized reference page at which information regarding transactions to which the user is (or has been) a party may be viewed. Further, a personalization application 52 may enable a user to personalize listings and other aspects of their interactions with the marketplace 12 and other parties.

In one embodiment, the network-based marketplace 12 may support a number of marketplaces that are customized for specific geographic regions, or specific demographics. A version of the marketplace 12 may be customized for the United Kingdom, whereas another version of the marketplace 12 may be customized for the United States. Each of these versions may operate as an independent marketplace, or may be customized (or internationalized) presentations of a common underlying marketplace.

Navigation of the network based-marketplace 12 may be facilitated by one or more navigation applications 56. For example, a search application may enable key word searches of listings published via the marketplace 12. A browse application may allow users to browse various category, catalogue, or inventory data structures according to which listings may be classified within the marketplace 12. Various other navigation applications may be provided to supplement the search and browsing applications.

In order to make listings, available via the network-based marketplace 12, as visually informing and attractive as possible, the marketplace applications 30 may include one or more imaging applications 58 which users may utilize to upload images for inclusion within listings. An imaging application 58 may also operate to incorporate images within viewed listings. The imaging applications 58 may also support one or more promotional features, such as image galleries that are presented to potential buyers. For example, sellers may pay an additional fee to have an image included within a gallery of images for promoted items.

Listing creation applications 60 may allow sellers conveniently to author listings pertaining to goods or services that they wish to transact via the marketplace 12, and listing management applications 62 may allow sellers to manage such listings. For example, where a particular seller has authored and/or published a large number of listings, the management of such listings may present a challenge. The listing management applications 62 may provide a number of features (e.g., auto-relisting, inventory level monitors, etc.) to assist the seller in managing such listings. One or more post-listing management applications 64 may also assist sellers with a number of activities that typically occur post-listing. For example, upon completion of an auction facilitated by one or more auction applications 44, a seller may wish to leave feedback regarding a particular buyer. To this end, a post-listing management application 64 may provide an interface to one or more reputation applications 50, so as to allow the seller conveniently to provide feedback regarding multiple buyers to the reputation applications 50.

Dispute resolution applications 66 provide mechanisms whereby disputes arising between transacting parties may be resolved. For example, the dispute resolution applications 66 may provide guided procedures whereby parties are guided through a number of steps in an attempt to settle a dispute. In the event that the dispute cannot be settled via the guided procedures, the dispute maybe escalated to a third party mediator or arbitrator.

A number of fraud prevention applications 68 may implement various fraud detection and prevention mechanisms to reduce the occurrence of fraud within the marketplace 12.

Messaging applications 70 may be responsible for the generation and delivery of messages to users of the network-based marketplace 12, such messages for example advising users regarding the status of listings at the marketplace 12 (e.g., providing "outbid" notices to bidders during an auction process or to provide promotional and merchandising information to users).

Merchandising applications 72 may support various merchandising functions that are made available to sellers to enable sellers to increase sales via the marketplace 12. The merchandising applications 80 also provide the various merchandising features that may be invoked by sellers, and may monitor and track the success of merchandising strategies employed by sellers.

The network-based marketplace 12 itself, or one or more parties that transact via the marketplace 12, may operate loyalty programs that are supported by one or more loyalty/promotions applications 74. For example, a buyer may earn loyalty or promotions points for each transaction established and/or concluded with a particular seller, and be offered a reward for which accumulated loyalty points can be redeemed.

Location based application(s) 75 may support various geographical correlation functions including extracting geographical coordinates (such as latitude, longitude and altitude) from a hypertext (HTTP) transmission from a client, associating geographical coordinate proximity ranges for content (such as product/offer listings, service listings, etc.), database searching and matching functions (such as database lookup comparison functions for comparing client extracted geographical coordinates with product/offer/service listings to return geographical correlated content), vendor/offerer based functions to store client predetermined requests for offers from predetermined vendors/offerers when in a geographical proximity to the predetermined vendors/offerers, comparison/lookup functions to compare/lookup geographical correlated content for a predetermined price range, and client geographical correlation functions to compare/lookup databases for content associated with a client's geographical route for returning content associated with vendors/offerers located along the client's route.

In one embodiment a user may pre-select a price range, and a location application may match offers of goods or services (or other listings) within a pre-selected geographical range or zone that is also within the pre-selected price range. The matched offers may then be returned to the user/client.

In another embodiment a location application may alert a user/client by sending an email alerting the user/client that an offer is within the pre-selected geographical zone and within a pre-selected price range. In this embodiment, a user/client can wait until the criteria ranges are met. In another embodiment, offerers are alerted with an email that a user/client desires a good or service within a pre-selected zone and price range. This allows the offerer to adjust price or make a delivery to the pre-selected geographical zone.

In one embodiment a user may pre-select a route having at least a beginning and ending waypoint. In this embodiment offers from merchants along the route, and within a pre-selected geographical range of the route, may be returned to the user/client. In one embodiment the user/client may be navigated to a merchant's location through alerts on a display (e.g., turn arrows, spelling out of turn directions, voice instructions, etc.). Any known navigation applications/devices can be used in this embodiment, such as the Magellan® Road Mate 700, Garmin® Quest, iQue® 3600 GPS/PDA, notebook computer with navigation software and a GPS device, etc.

In another embodiment different users/clients compete in auctions of offers for the goods and services (or other listings).

Data Structures

Figure 3:
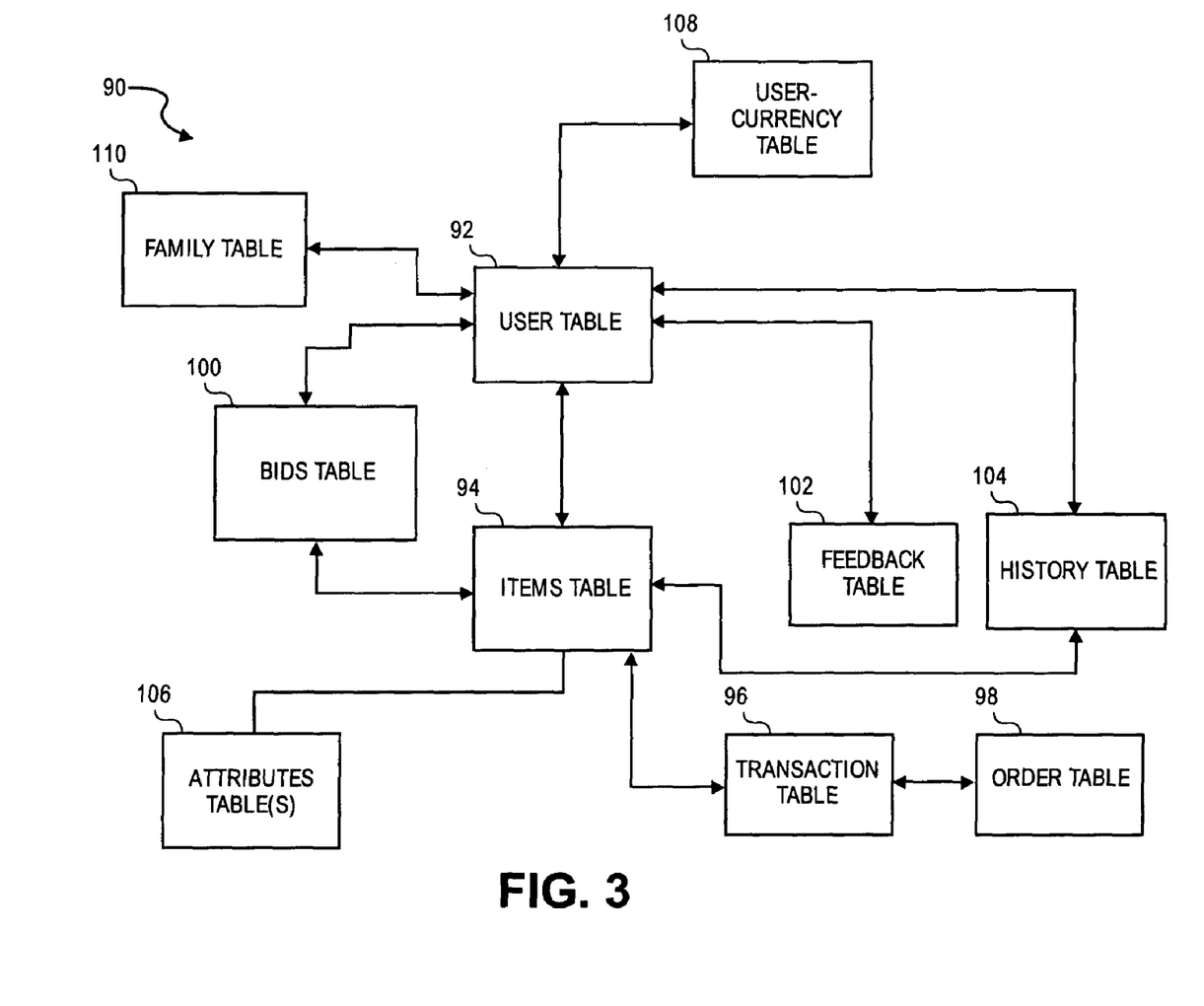
FIG. 3 is a high-level entity-relationship diagram, illustrating various tables that may be maintained within databases utilized by the marketplace and payment applications of FIG. 2.

FIG. 3 is a high-level entity-relationship diagram, illustrating various tables 90 that may be maintained within the databases 36, and that are utilized by and support the marketplace and payment applications 30 and 32. A user table 92 contains a record for each registered user of the network-based marketplace 12, and may include identifier, address and financial instrument information pertaining to each such registered user. A user may, it will be appreciated, operate as a seller, a buyer, or both, within the network based marketplace 12. In one exemplary embodiment, a buyer may be a user that has accumulated value (e.g., commercial or proprietary currency), and that is then able to exchange the accumulated value for items that are offered for sale by the network-based marketplace 12.

The tables 90 also include, for example, an items table 94 in which is maintained item records for goods and services that are available to be, or have been, transacted via the marketplace 12. In one embodiment, the items table includes geographical associated items. For example, the items may be tagged with the buyer/seller geographical location and/or geographical acceptance range. Each item record within the items table 94 may furthermore be linked to one or more user records within the user table 92, so as to associate a seller and one or more actual or potential buyers with each item record.

A transaction table 96 may contain a record for each transaction (e.g., a purchase transaction) pertaining to items for which records exist within the items table 94.

An order table 98 may be populated with order records, each order record being associated with an order. Each order, in turn, may be with respect to one or more transactions for which records exist within the transactions table 96.

Bid records within a bids table 100 may each relate to a bid received at the network-based marketplace 12 in connection with an auction-format listing supported by an auction application 44. A feedback table 102 may be utilized by one or more reputation applications 50, in one exemplary embodiment, to construct and maintain reputation information concerning users. A history table 104 may maintain a history of transactions to which a user has been a party. One or more attributes tables 106 may record attribute information pertaining to items for which records exist within the items table 94. Considering only a single example of such an attribute, the attributes tables 106 may indicate a currency attribute associated with a particular item, the currency attribute identifying the currency of a price for the relevant item as specified in by a seller.

In another embodiment user a currency table 108 may include geographical based currency and currency conversion (to compare home-based currency with mobile-based currency if out of the home country). In this embodiment, when a user leaves their respective home country, if the new country has a different currency a conversion of the home-based currency to the new country currency may be made and returned to the user to ease transactions.

Figure 4:
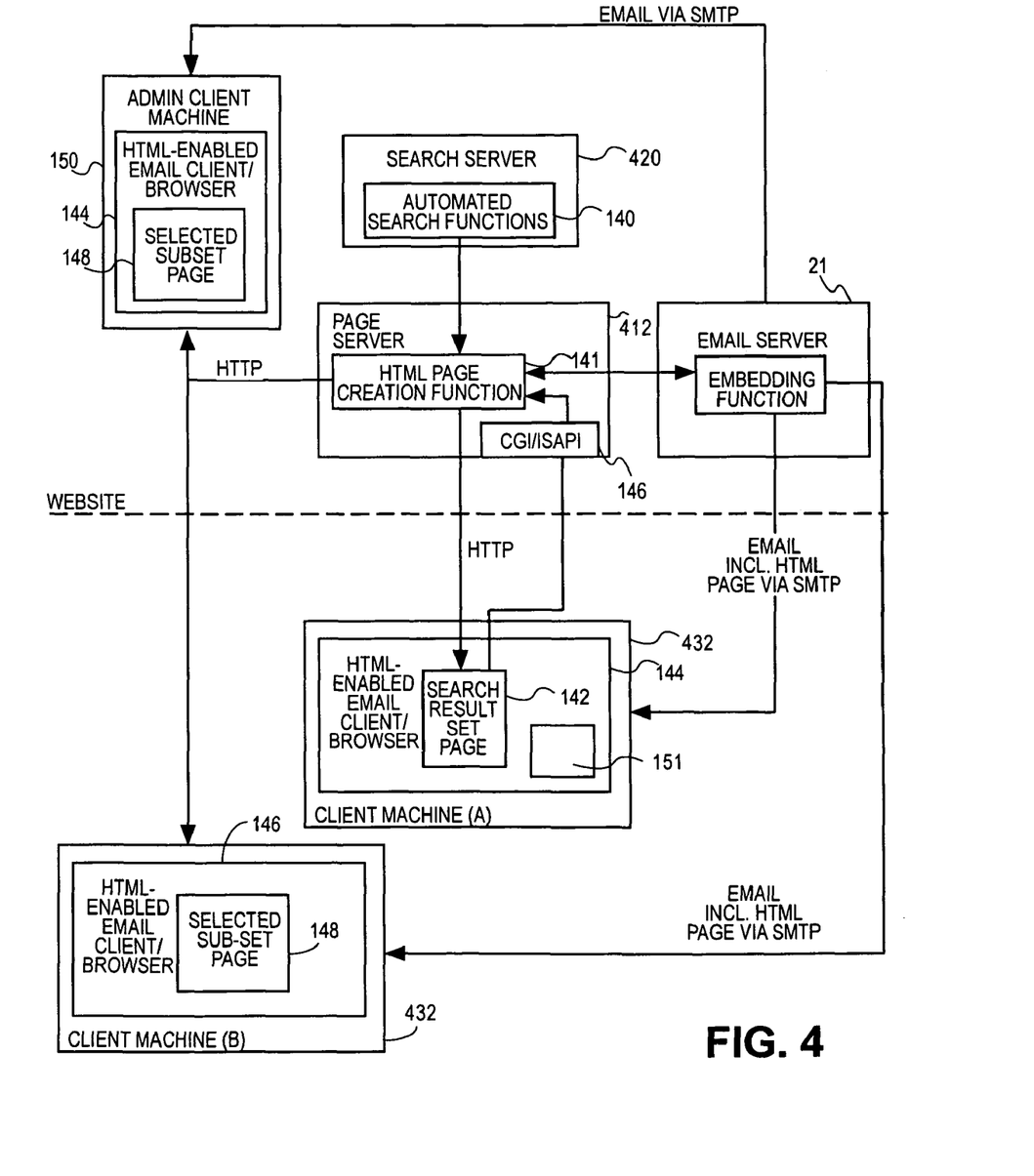
FIG. 4 is a block diagram illustrating an exemplary environment within which email alerts to sellers/buyers may be made when a seller/buyer is in a predetermined range.

FIG. 4 illustrates a specific exemplary environment within which email alerts to sellers/buyers may be made when a seller/buyer is in a predetermined range or zone. In one exemplary embodiment, an automatic telephone recording is sent to the buyer/seller instead of an email alert. The alerts may allow a buyer/seller to be aware that a respective seller/buyer is within a range (e.g., a predetermined range or zone) of one another and allows the buyer/seller to inform the respective seller/buyer of particular items/services wanted or offered.

System 10 may provide an automated "watching" service to users, whereby an automated search is periodically conducted to locate offered/wanted items, as identified utilizing specified search criteria. In addition to providing this automated "watching" service to a broad user base, the service may also be employed by companies and regulatory authorities to monitor network-based auction facilities for irregular and illegal items. Such items may include, for example, copyright-infringing articles, unauthorized imitation products, and unauthorized utilization of trademarks. Further, regulatory authorities may utilize the automated "watching" service to detect the attempted sale of illegal items such as drugs, firearms, etc.

When a user of the "watching" service receives an automated notification (e.g., email, telephone message, page, etc.) of the existence of certain items that are offered or wanted within system 10, the user (e.g., a corporation or a regulatory authority) may wish to request that administrators of system 10 remove certain items from system 10. To this end, problematic items must be reported to administrators of system 10, who then perform an independent review of the relevant item, and remove the items as appropriate. The administrators may then be required to report to the relevant monitoring user regarding whether or not the items have been removed.

It will be appreciated that where a large number of potentially problematic items are located by an automated watching service and communicated to a monitoring user (e.g., a company seeking to protect copyrights or trademarks), the identification of problematic items, and the communication of such identified items to the administrators of system 10 may be cumbersome and/or inconvenient. In one embodiment, a monitoring user may be required to provide, verbally or by e-mail, item identifiers (e.g., item numbers) for each of the relevant items. This may require the monitoring user to perform a cut and paste of selected item numbers that are then communicated in an e-mail to an administrator. The administrator may then typically be required manually to input a relevant item number into an appropriate interface in order to retrieve the full details regarding an item. Where a large number of items are identified by a monitoring user as being potentially problematic, this back and forth process may be particularly time consuming and/or cumbersome.

In FIG. 4 search server 420 of the system 10 is shown, by way of example, to perform a number of automated search functions 140 to provide the above-discussed automated "watching" services and to generate a result set of items according to a specified search criteria. The result set may be communicated from the search server 420 to a page server 412 that generates a markup language document (e.g., an HTML page), for example, by populating a template with the result set to thereby generate a search result set page 142. The search result set page 142 may, for example, be an HTML document, or may be a text-based e-mail message that includes a network location identifier (e.g., URL) that identifies an HTML document embodying the search results. In FIG. 4, the search result set page 142 is shown to be communicated to an HTML-enabled e-mail client or browser 144 that executes in client machine A 432.

The search result set page 142 may include number of check boxes adjacent to each of the data items identifying the search result set. By checking the check boxes, the user is able to identify a subset of the search result set and to communicate the selected subset back to the page server 412 by selection of "submit" button presented within the search result set page 142. For example, the subset may be communicated as an e-mail message or an HTTP PUT request, or utilizing any other transfer protocol or communication. The page server 412 may execute a CGI script, or an ISAPI script, 146 that receives the communication of the subset of the search results, parses the communication to locate item identifiers (e.g., numeric or otherwise) embodied within the communication and communicates these identifiers to a page creation function 141. The page creation function 141 may then compose a new markup language document embodying the subset of the search result set.

The markup language document embodying the subset of search results may, for example, be communicated to a further user in one of two ways. In one embodiment, the page creation function 141 may communicate a URL identifying the created page to any email server 21, which may compose a text-based email message that is then communicated from the email server 21 to a client machine B 432 of a targeted user. In this case, utilizing the URL embedded in the email message, the user of the client machine B 432 may access the created markup language document utilizing a browser application.

In an alternative embodiment, the page creation function 141 may communicate a markup language document to the email server 21, which may embed the markup language document in an email message. The email message may then be communicated to an HTML-enabled email client 146 executing on the client machine B 432 which the user of the client machine B 432 may utilize to view the markup language document. An example of this markup language document is indicated in FIG. 4 as being the selected subset page 148.

In FIG. 4, client machines A and B 432 are shown to reside outside the context of a web site. Accordingly this embodiment describes an application which allows a first user of a client machine 432 (e.g., client machine (A)) to communicate a subset of search results to a user of a further client machine 432 (e.g., client machine (B)), both of which reside outside a web site or commerce facility.

An alternative application may allow the user of a client machine B 432 to communicate the selected subset 148 of the search results to an administrator of a commerce facility (or web site) that utilizes an administrator client machine 150. In this case, an email (e.g., a text-based or HTML-based email message) is sent to the administrative client machine 150 to conveniently communicate the items that are considered by the user of client machine B 432 to be potentially problematic to the administrator. Further, when the selected subset page 148 is a markup language page document providing a listing of the items as hypertext, the administrator may also conveniently be able to select appropriate hypertext to invoke a full description of the relevant item, and in this way spared the effort of manually inserting identifiers for items that have been identified by a monitoring user.

Figure 5:
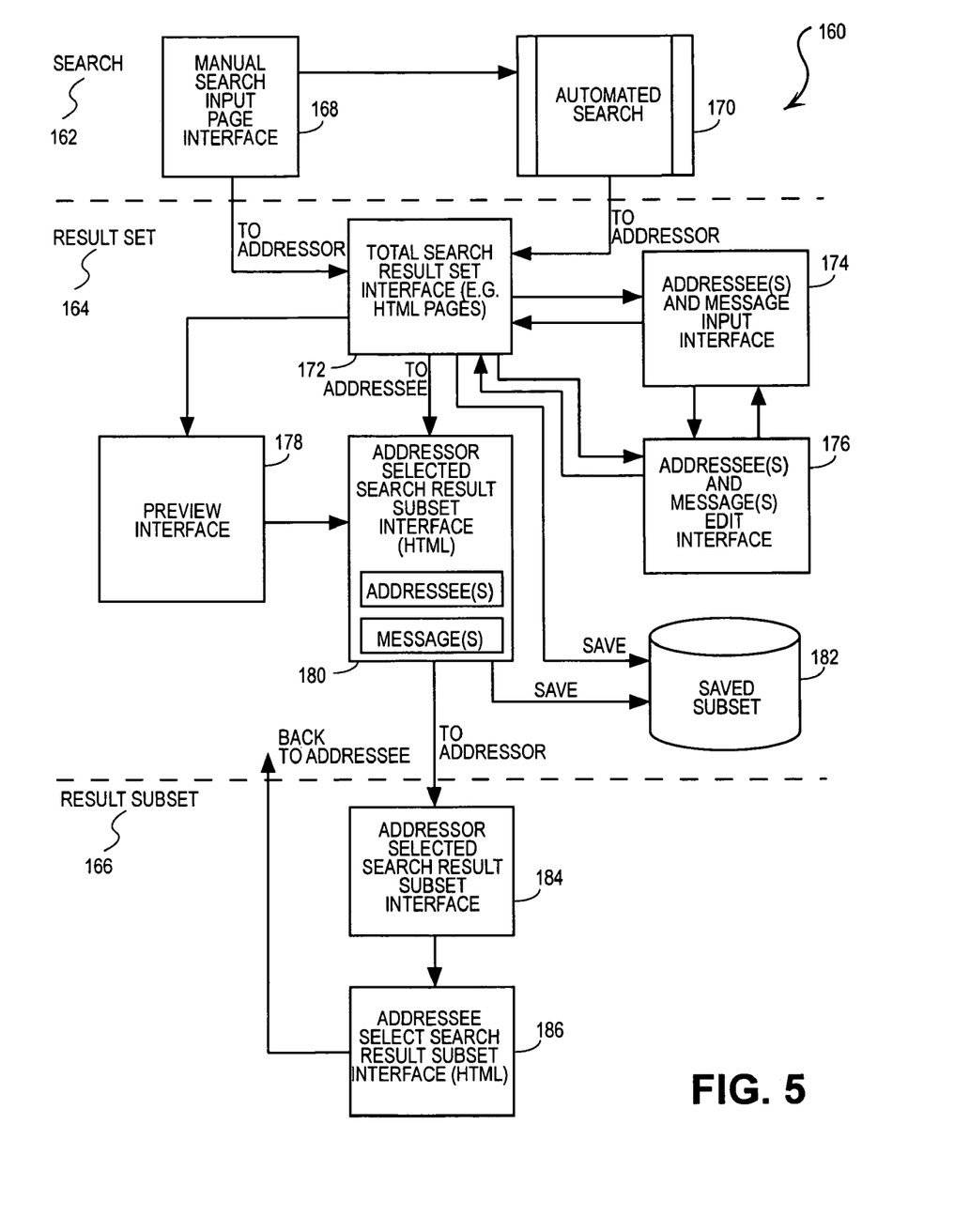
FIG. 5 is an interface map illustrating a collection of interfaces, according to an exemplary embodiment of the present invention, to facilitate communication of search results between entities.

FIG. 5 is an interface map 160, according to an exemplary embodiment, illustrating a collection of interfaces that may be presented to entities (e.g., users or administrators) to facilitate the communication of search results between such entities. The interfaces are furthermore categorized, for example, as comprising search interfaces 162, result set interfaces 164 and result subset interfaces 166.

A first user may be presented with manual search input page interface 168 that facilitates the input and specification of search criteria. The input into interface 168 may, in one embodiment, be stored as an automated search 170.

Regardless of whether a search is conducted as a result of a specific (e.g., unique) search request inputted into interface 168, or as automated search 170, a search result set may be presented in a result set interface 172. In one embodiment, the result set interface 172 comprises a markup language document in the form of an HTML page that lists a descriptor for each of the search results. Each descriptor may comprise hypertext linked to a document.

Each descriptor may furthermore be displayed adjacent a check box, which is user-selectable to mark a data item to be included within a subset of the search results to be communicated to a further entity. The interface 172 may further present a "submit" or "send" button that is user-selectable to communicate the select subset, together with a default message, to a default addressee.

An addressee and message selection input interface 174 may also be accessible from the result set interface 172. Utilizing the interface 174, an addressor entity may chose from a number of pre-defined messages to accompany the subset of the result set, and also specify one or more addressees.

An addressee and message edit interface 176 may also be accessible from the result set interface 172 and/or the input interface 174. Utilizing the interface 176, an addressor user may edit a list of potential addressees, and also edit or author messages presented for selection in the input interface 174.

A preview interface 178 may be accessible from the result set interface 172, and allow an addressor to preview the subset and messages to be communicated to the addressee. For example, the preview interface 178 may present the HTML page that includes hypertext descriptors of the data items of the search result subset.

A subset interface 180 may then be presented to the addressor for review. The subset interface 180 may include hypertext descriptors of the data items of the search result subset and may also include a listing of one or more addressees and a message to accompany the result subset (e.g., the default or user-specified message).

The selected search result may also be saved as a saved subset 182 from either the search result set interface 172 or by performing an appropriate user-selection within the subset interface 180.

The search result subset, as described within the exemplary context of an HTML document, may then be communicated to the addressee as a result subset interface 180 that may be viewable by the addressee (e.g., user). The result subset interface 180, as described by way of example above, may include descriptors for each of the data items of the subset, each descriptor may comprise hypertext. Accordingly, user selection of the hypertext may conveniently cause a retrieval of a full document included in the result subset. Further, each of the descriptors presented within the result subset interface 180 may also be presented in association with a check box to facilitate addressee or user selection from within the subset. Utilizing the check boxes, this addressee may then define a narrowed subset of the search result set, and utilizing interfaces similar to those described above, communicate a narrowed subset back to the original addressor (e.g., a vendor), or to further addressees. This narrowed subset of the search results may again be listed within the context of a subset interface 186 and may include a message appropriate to the narrowed subset.

Figure 6:
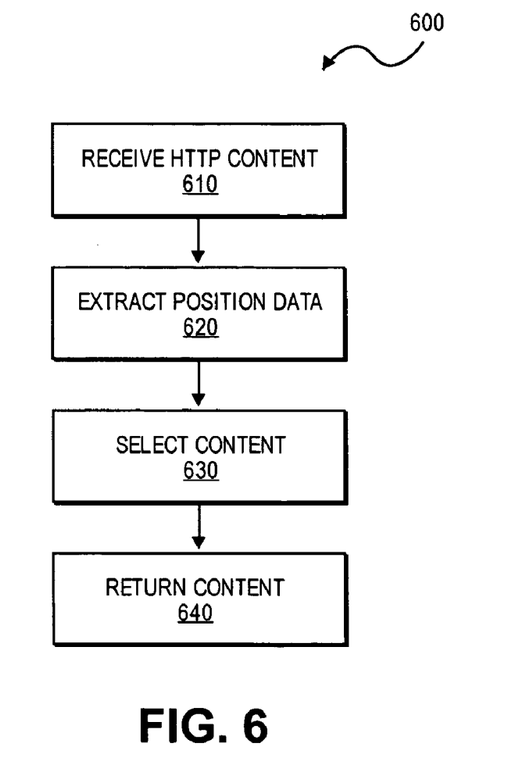
FIG. 6 illustrates a block diagram of an exemplary process for receiving geographical position data in hyperlinked content.

FIG. 6 illustrates an exemplary block diagram of a process or method for receiving geographical position data in hyperlinked content (e.g., an http transmission). Process 600 begins with block 610 where a device, such as a server, receives hyperlinked content from a user. The hyperlinked content includes current geographical position data. In block 620, the device extracts the current geographical position data from the hyperlinked content. In block 630, the device selects geographically-based content (e.g., goods/services/material or other listings) based on the current geographical position data. In one embodiment, the device uses database functions to select content that is linked with geographical zone information. The database function searches with the current geographical position or location data and if a match exists, matches the geographically linked content where the current geographical position data falls within the geographical zone. In block 640 the geographically-based content is returned (communicated) to the user.

In one embodiment, the current geographical position data is rendered by triangulation of a cellular telephone using known triangulation methods. In another embodiment, current geographical position data is rendered by a GPS device. The current geographical position data may include longitude and latitude data and, optionally, altitude data.

In one embodiment, in block 610 a user pre-selects a price range for geographically-based content. The pre-selected price range may be received by the device and used by the database to function as a further content matching criteria, where the geographically linked content is also linked with a price or price range.

In one embodiment, a user may pre-select a geographically-based product/listing and the device may receive the geographical based product/listing in the hyperlinked content. A database function may use the geographically-based product/listing identification to search and match a database for the product/listing that is within a range or desired geographical position or zone. In one embodiment, the device may alert the user when the pre-selected geographically-based product/listing is offered within a pre-selected price range and within a pre-selected zone. In one embodiment, the alert may be via an email sent to the user. In another embodiment, a voicemail may be sent by the device, the user may be paged, an Instant Message (IM) may be sent, or the like.

In one embodiment, in process 600 a user may select a route having at least a beginning and ending postion/location. The route may be within a geographical zone or area. Route way-points may be pre-selected for the route. Returned offers may arise from offerers (people, entities offering products/listings) along the route. In this embodiment, the user may have a location device that renders current geographical position data (e.g., location coordinates). The current geographical position data may be received by the device and when the user is within a pre-selected physical range (e.g., 1000 feet, 1 mile, 10 miles, etc.) of the offerer along the route, the device may transmit content including goods and/or services offered. In one embodiment users/clients may compete with other users/clients in an auction for the goods and/or services.

Figure 7:
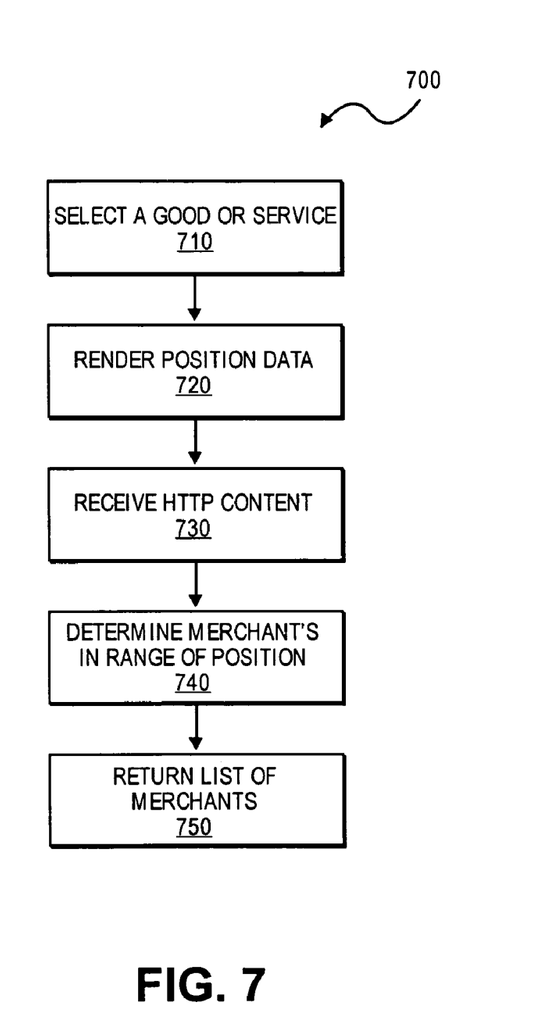
FIG. 7 illustrates a block diagram of an exemplary process for returning a list of merchants/vendors within a pre-selected range of a user.

FIG. 7 illustrates a block diagram of an exemplary process or method for returning a list of merchants within a pre-selected range (e.g., a physical range or distance) of a user. Process 700 begins with block 710 where one or more goods/ services or other listings are selected by a user. In block 720 a location rendering device (e.g., provided at a user's client device) may render current geographical position data. In block 730 a device (e.g., a server) may receive hyperlinked content transmitted from the user/client that includes the current geographical position data. In block 740 a database function searches for information on vendors/merchants that is stored and linked with geographical location range data. When the database function matches one or more vendors/merchants in the pre-selected range of the user/client, as shown at block 750, a list of merchants may be returned that have the one or more goods and/or services (e.g., pre-selected goods and/or services) in inventory to the user/client.

In one embodiment, the location rendering device may receive geographical data of the current position from triangulation of a cellular telephone by an external device. In another embodiment, the location rendering device is a UPS. The current geographical position data may include longitude and latitude data and, optionally, altitude data (which may be useful in tall buildings, mountainous areas, canyons, etc.).

In another embodiment, a user may pre-select a price range for at least one product/listing (e.g., a good and/or a service). In this embodiment the list of vendors/merchants may be returned to the user/client where the list has the at least one product/listing offered within the pre-selected price range.

In one embodiment, the device may transmit an email alert to the user when the at least one product/listing is offered within the pre-selected price range and within a pre-selected zone. In another embodiment the device transmits a voicemail to the user.

In one embodiment vendors/merchants may be sent an email alert from the device when the vendors/merchants are within the range of the current geographical position data of the user and offer goods and/or services within the selected price range. In one embodiment, the merchants can then offer the goods and/or services to the user/client for the originally offered price or a modified price. Therefore, in this embodiment, the vendors/merchants can compete with one another for business.

In one embodiment a user may select (e.g., pre-select) a route by selecting at least two way-points (e.g., a beginning location and an ending location). In this embodiment the returned list of vendors/merchants may arise from vendors/merchants that are located within a desired range (e.g., 500 feet, 1 mile, 10 miles, etc.) along the route. The desired range can be pre-selected either by a user or set on the device by an administrator. In one embodiment users may compete with other users in an auction for the at least one product/listing.

Figure 8:
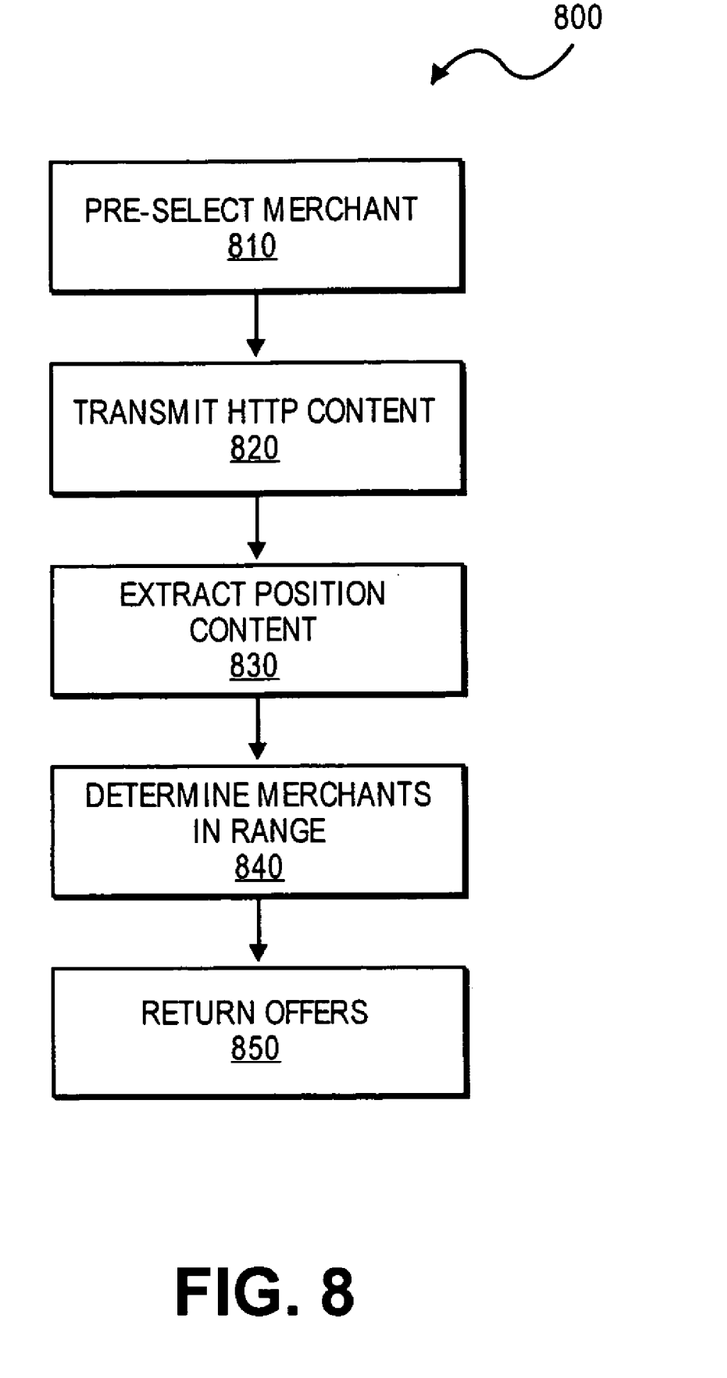
FIG. 8 illustrates a block diagram of an exemplary process that may return offers from vendors (e.g., pre-selected merchants or vendors) when a user is in range (e.g., a geographical range or zone) of the merchants.

FIG. 8 illustrates a block diagram of an exemplary process or method that returns offers from vendors/merchants (e.g., pre-selected vendors) when a user is within a physical range of the vendors/merchants. Process 800 begins with block 810 where a user (e.g., a person or commercial business) pre-selects merchants that have goods/services/materials or other listings to offer so as to receive offers from the selected vendors/merchants. In block 820 the user may transmit hyperlinked content to a device (e.g., a server), where the hyperlinked content includes current geographical position data of the user/client. In block 830 the device may extract the current geographical position data. In block 840 a database function may determine pre-selected vendors/merchants within a range (e.g., a pre-selected) of the current geographical position data. The vendors/merchants may be linked with geographical information, such as location (e.g., latitude and longitude and, optionally, altitude coordinates). The database function may search the database for vendors/merchants having locations falling in a range or zone (e.g., 500 feet, 1 mile, 10 miles, etc.). It will be appreciated that the range or zone may be a pre-selected zone or range.

In block 850 available offers from the vendors/merchants in the range of the current geographical position data may be communicated or returned to the user/client. In one embodiment, the current geographical position data is rendered by triangulation of a cellular telephone, for example, by an external device. In another embodiment the current geographical position data is rendered utilizing a GPS device. The current geographical position data may include longitude data, latitude data, and, optionally, altitude data.

In one embodiment available offers from the pre-selected vendors/merchants are shown on a display when a user is within the (pre-selected) range, the user's location or position being identified by their current geographical position data. The display can be any type of display. In one embodiment a quantity of offered products/listings in a merchant's inventory may be shown on a display of the client device or machine. In this embodiment, the user can determine if the vendor/merchant has enough of a quantity to offer. For example, if the user desires to purchase four specific types of tires and a merchant shows only three of those tires in stock, the user can then look for another merchant that has the desired amount.

In one embodiment, the user may navigate to a merchant's location where the merchant has at least one offered product that the user has selected. Any known navigation applications/devices can be used in this embodiment, such as the Magellan® Road Mate 700, Garmin® Quest, iQue® 3600 GPS/PDA, etc.

In one embodiment, a user can transmit a counter-offer to any one or more vendors/merchants offering goods, services, listings or materials. In this embodiment the device may send an email alert to the user to inform the user whether the counter-offer is accepted or rejected. In addition or instead, a voicemail may be sent to the user informing the user whether the counter-offer was accepted or not.

Figure 9:
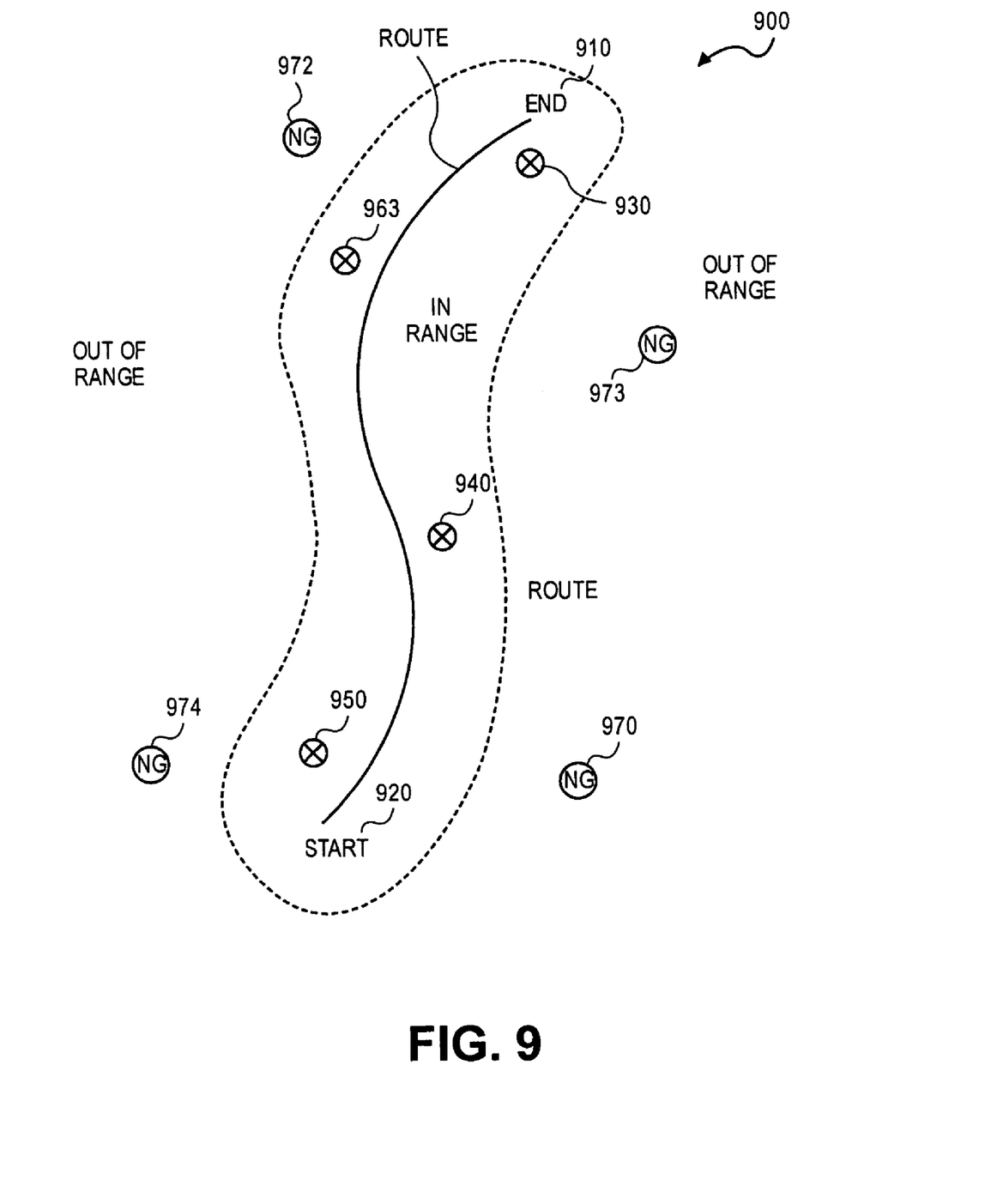
FIG. 9 illustrates an exemplary route that may be selected (e.g., predetermined) by a user.

FIG. 9 illustrates an example route that may be selected (e.g., predetermined) by a user. Exemplary route 900 has a start or beginning waypoint 920 and an ending waypoint 910. The path between beginning waypoint 920 and ending waypoint 910 may identify the selected route. It should be noted that one or more waypoints can be entered (and, for example, shown on a display). Vendors/merchants considered to be within the range (e.g., a pre-selected range) may lie within the dotted line. Thus the dotted line in FIG. 9 may define the perimeter or border of a zone of interest to a specific client device. In the example shown in FIG. 9, the vendors/merchants in range are vendor/merchant 930, vendor/merchant 940, vendor/merchant 950 and vendor/merchant 963. It will be appreciated that more or less vendors may be provided within the range. Exemplary vendors/merchants out of the range are vendor/merchant 970, vendor/merchant 972, vendor/merchant 973, and vendor/merchant 974. In one embodiment merchants that lie out of the range are still shown on the display. In this embodiment the user can decide whether to travel farther or not.

Figure 10:
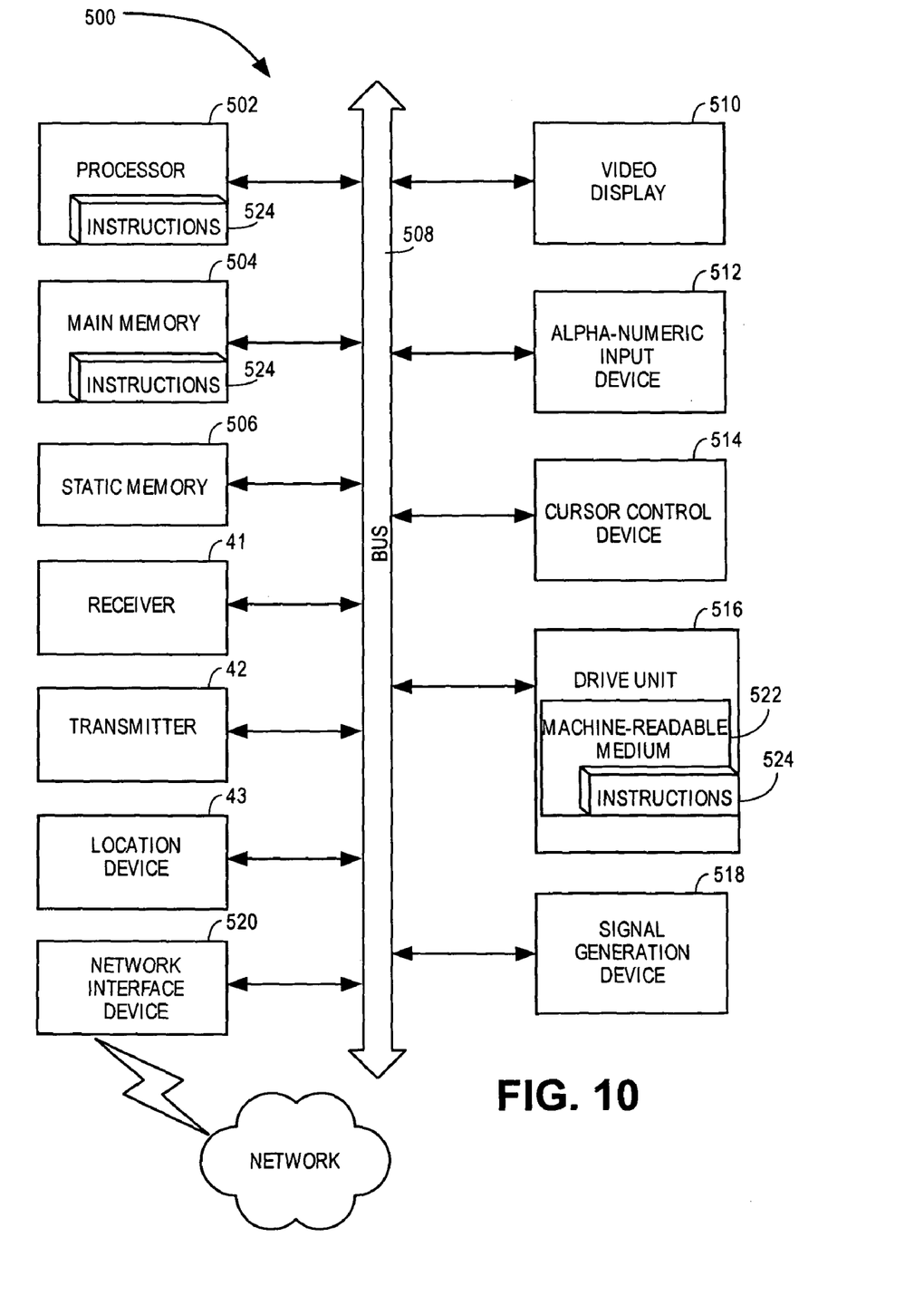
FIG. 10 illustrates a diagrammatic representation of machine in the exemplary form of a computer system.

FIG. 10 shows a diagrammatic representation of machine in the exemplary form of a computer system 500 within which a set of instructions, for causing the machine to perform any one or more of the methodologies discussed herein, may be executed. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a PC, a tablet PC, a set-top box (SIB), a PDA, a cellular (or mobile) telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processor 502 (e.g., a central processing unit (CPU), a graphics processing unit (GPU) or both), a main memory 504 and a static memory 506, which communicate with each other via a bus 508. The computer system 500 may further include a video display unit 510 (e.g., a liquid crystal display (LCD) or a cathode ray tube (CRT)). The computer system 500 also includes an alphanumeric input device 512 (e.g., a keyboard), a cursor control device 514 (e.g., a mouse), a disk drive unit 516, a signal generation device 518 (e.g., a speaker) and a network interface device 520.

The disk drive unit 516 includes a machine-readable medium 522 on which is stored one or more sets of instructions (e.g., software 524) embodying any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media.

The software 524 may further be transmitted or received over a network 526 via the network interface device 520. In one embodiment, receiver 41, transmitter 42 and location device 43 (see FIG. 1) are coupled to bus 508.

While the machine-readable medium 526 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present invention. The machine-readable medium includes any mechanism that provides (i.e., stores and/or transmits) information in a form readable by a machine (e.g., a computer, PDA, cellular telephone, etc.). For example, a machine-readable medium includes read-only memory (ROM); random-access memory (RAM); magnetic disk storage media; optical storage media; flash memory devices; biological electrical, mechanical systems; electrical, optical, acoustical or other form of propagated signals (e.g., carrier waves, infrared signals, digital signals, etc.). The device or machine-readable medium may include a micro-electromechanical system (MEMS), nanotechnology devices, organic, holographic, solid-state memory device and/or a rotating magnetic or optical disk. The device or machine-readable medium may be distributed when partitions of instructions have been separated into different machines, such as across an interconnection of computers or as different virtual machines.

Thus, a method and system to have been described. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Accordingly, the specification and drawings are to be regarded in an illustrative rather than a restrictive sense.

What is claimed is:

1. A wireless data system, said wireless data system comprising:
   a plurality of servers coupled to a wide-area network, said servers having
   product offers
   with location information;
   a wireless device, said wireless device comprising
   a wireless receiver and transmitter,
   a location unit to render location data,
   a display, and
   a client program to communicate with the wide-area network using said wireless receiver and transmitter, the client program sending product offer requests including a current location of the wireless device to the plurality of servers;
   a requester alert generator forming part of at least one device configured to return at least one response product offer to the wireless device in response to receiving a product offer request from the wireless device, the response product offers being selected from said product offers on the plurality of servers based at least partly on the current location of the wireless device; and
   an offerer alert generator form in part of one or more devices, said offerer alert generator configured to send an alert to an offerer associated with said at least one response product offer when the offerer is within a predefined range of the current location of the wireless device.

2. The wireless data system as set forth in claim 1, wherein the location unit is to render the current location as current location coordinates by triangulation of a cellular telephone.

3. The wireless data system as set forth in claim 1, wherein the location unit is a global positioning system (GPS).

4. The wireless data system as set forth in claim 1, wherein the client program pre-selects a price range for the product offer requests, and the response product offers are within the pre-selected price range.

5. The wireless data system as set forth in claim 4, wherein the client program pre-selects a geographically-based product and is alerted when the selected geographically-based product is offered within the pre-selected price range and within a pre-selected geographical zone.

6. The wireless data system as set forth in claim 1, wherein the program client pre-selects a route, and the returned offers arise from offers from offerers along the route.

7. The wireless data system as set forth in claim 1, wherein the client program competes with other client programs in an auction for at least one of goods and services.

8. The wireless data system as set forth in claim 1, said system further comprising:
   a processing unit coupled to the display, the processing unit being to process the response product offers returned by the at least one server and render the response product offers on the display, and
   a user interface coupled to the processing unit for receiving user input.

9. The wireless data system as set forth in claim 8, wherein the wireless device is included within one of a cellular telephone, a personal digital assistant (PDA), a personal computer (PC), a palm computer, and a notebook computer.

10. The wireless data system as set forth in claim 8, wherein the client program is navigated to a location of said offerer.

\* \* \* \* \*

UNITED STATES PATENT AND TRADEMARK OFFICE
CERTIFICATE OF CORRECTION

| | | |
|---|---|---|
| PATENT NO. | : 7,890,376 B2 | |
| APPLICATION NO. | : 10/982239 | |
| DATED | : February 15, 2011 | |
| INVENTOR(S) | : James Barrese et al. | |

It is certified that error appears in the above-identified patent and that said Letters Patent is hereby corrected as shown below:

On the Title page, item (75), in "Inventors", in column 1, line 2, delete "Pritchett L. Dan" and insert -- Dan L. Pritchett --, therefor.

In column 8, line 41, delete "432" and insert -- 432, --, therefor.

In column 10, line 51, delete "postion/location." and insert -- position/location. --, therefor.

In column 11, line 17, delete "UPS." and insert -- GPS. --, therefor.

In column 14, lines 5-31, in Claim 1, delete
"1. A wireless data system, said wireless data system comprising:
a plurality of servers coupled to a wide-area network, said servers having
product offers
with location information;
a wireless device, said wireless device comprising
a wireless receiver and transmitter,
a location unit to render location data,
a display, and
a client program to communicate with the wide-area network using said wireless receiver and
  transmitter, the client program sending product offer requests including a current location of
  the wireless device to the plurality of servers;
a requester alert generator forming part of at least one device configured to return at least one
  response product offer to the wireless device in response to receiving a product offer
  request from the wireless device, the response product offers being selected from said
  product offers on the plurality of servers based at least partly on the current location of
  the wireless device; and
an offerer alert generator form in part of one or more devices, said offerer alert generator configured
  to send an alert to an offerer associated with said at least one response product offer when
  the offerer is within a predefined range of the current location of the wireless device."

Signed and Sealed this
Twelfth Day of April, 2011

David J. Kappos
*Director of the United States Patent and Trademark Office*

CERTIFICATE OF CORRECTION (continued)
U.S. Pat. No. 7,890,376 B2 and insert

-- 1. A wireless data system, said wireless data system comprising:
a plurality of servers coupled to a wide-area network, said servers having product offers with location information;
a wireless device, said wireless device comprising
a wireless receiver and transmitter,
a location unit to render location data,
a display, and
a client program to communicate with the wide-area network using said wireless receiver and transmitter, the client program sending product offer requests including a current location of the wireless device to the plurality of servers;
a requester alert generator forming part of at least one device configured to return at least one response product offer to the wireless device in response to receiving a product offer request from the wireless device, the response product offers being selected from said product offers on the plurality of servers based at least partly on the current location of the wireless device; and
an offerer alert generator form in part of one or more devices, said offerer alert generator configured to send an alert to an offerer associated with said at least one response product offer when the offerer is within a predefined range of the current location of the wireless device. --, therefor.

In column 14, line 26, in Claim 1, delete "form in" and insert -- forming --, therefor.